(12) United States Patent
Ochiai et al.

(10) Patent No.: US 6,178,998 B1
(45) Date of Patent: Jan. 30, 2001

(54) REVERSE FLOW PREVENTION APPARATUS

(75) Inventors: Masaru Ochiai; Nobuyuki Matsuura; Makoto Katou, all of Komaki (JP)

(73) Assignee: Kane Kougyou Co., Ltd., Aichi-ken (JP)

( * ) Notice: Under 35 U.S.C. 154(b), the term of this patent shall be extended for 0 days.

(21) Appl. No.: 09/521,270

(22) Filed: Mar. 8, 2000

(30) Foreign Application Priority Data

Jun. 29, 1999 (JP) .................................................. 11-183275

(51) Int. Cl.[7] .................................................. F16K 15/06
(52) U.S. Cl. ............... 137/512; 137/115.16; 137/115.18; 137/115.21
(58) Field of Search ................................ 137/614.2, 512, 137/115.16, 115.18, 115.21, 115.06

(56) References Cited

U.S. PATENT DOCUMENTS

| | | | | |
|---|---|---|---|---|
| 2,503,424 | * | 4/1950 | Snyder | 137/115.21 |
| 2,706,488 | * | 4/1955 | Harrington | 137/115.21 |
| 2,892,464 | * | 6/1959 | Glass | 137/115.21 |
| 4,190,071 | * | 2/1980 | Dean et al. | 137/115.16 |
| 4,232,704 | * | 11/1980 | Becker et al. | 137/218 |

* cited by examiner

*Primary Examiner*—A. Michael Chambers
(74) *Attorney, Agent, or Firm*—Flynn, Thiel, Boutell & Tanis, P.C.

(57) ABSTRACT

A reverse flow prevention apparatus is provided so as to drastically decrease pressure loss without installing an independent pressure regulator mechanism therein. With the reverse flow prevention apparatus, a flow path running along a straight line is provided in an outer box, and is partitioned by a diaphragm into an upstream region, and the downstream of a midstream region. An inner cylindrical body is provided at the center of the diaphragm, integrally therewith, so as to fit slidably into the upstream region of the outer box, an escape valve is provided on the downstream side of the inner cylindrical body in such a way as to be able to freely open and close a valve port provided between the midstream region and the downstream region while the escape valve is energized towards valve opening by the urging of an escape valve spring, and first and second check valves are provided inside the inner cylindrical body and the downstream region of the outer box, respectively. An effective diameter of the diaphragm and a diameter of a valve seat of the escape valve are set substantially at an equal value while a spring load of a first check valve spring and that of the escape valve spring are set such that a pressure of the midstream region is maintained always lower by a predetermined value than a pressure on the upstream side.

5 Claims, 8 Drawing Sheets

REVERSE FLOW PREVENTION APPARATUS

BACKGROUND OF THE INVENTION

1. Field of the Invention

The present invention relates to a reverse flow prevention apparatus for use mainly in a directly-connected water distribution system.

2. Description of the Related Art

As a conventional apparatus of this type, there is cited a pressure-reduction type reverse flow prevention apparatus a as shown in FIG. 10. The pressure-reduction type reverse flow prevention apparatus a is provided with first and second check valves d, e, which are installed upstream and downstream, respectively, in a flow path c formed inside a casing b thereof and which operate independently from each other, and is further provided with an intermediate chamber g equipped with a pressure regulator mechanism f between the first and second check valves d, e.

The pressure regulator mechanism f is provided with a bypass h linking the intermediate chamber g with a portion of the flow path c, on the upstream side thereof, and is capable of adjusting a pressure inside the intermediate chamber g so as to be always lower than a pressure on the upstream side and higher than that on the downstream side by blocking up the bypass h with a diaphragm i, and linking an escape valve k for opening and closing a drain outlet j of the intermediate chamber g with the diaphragm i through the intermediary of a valve bar m.

However, the pressure-reduction type reverse flow prevention apparatus a described above has a problem that it becomes large in size and heavy in weight because it is provided with the pressure regulator mechanism f which is mechanically independent, that is, the bypass h, the escape valve k, and so forth.

Further, the pressure-reduction type reverse flow prevention apparatus a has another problem in that pressure loss therein is very large because the same is constructed such that a pressure inside the intermediate chamber g is lessened to a level lower than that on the upstream side thereof due to magnitude of a spring load of a first check valve spring n of the first check valve d, that is, because a condition is set such that a resistance at which the first check valve d is opened by flow of water is rendered large, and a pressure inside the pressure-reduction type reverse flow prevention apparatus a is caused to fall gradually from the upstream of the flow path c towards the downstream thereof.

SUMMARY OF THE INVENTION

In order to solve these problems described above, a reverse flow prevention apparatus according to the invention comprises an outer box provided with a flow path formed coaxially therewith between an inlet and an outlet, and also provided with a drain outlet in a midstream region of the flow path, a diaphragm provided on the inner periphery of the outer box for partitioning the interior thereof into an upstream region of the flow path, and the downstream of the midstream region, an inner cylindrical body slidably fitted into the upstream region of the outer box, an escape valve provided on a face of an open end of the inner cylindrical body, on the downstream side, so as to be freely attachable to and detachable from a valve seat provided around a valve port formed between the midstream region and a downstream region, and energized in the direction of valve opening by the urging of an escape valve spring, and first and second check valves provided inside the inner cylindrical body and the downstream region of the outer box, respectively, such that reverse flow of a fluid from the downstream side can be prevented, so that by setting an effective diameter of the diaphragm and a diameter of the valve seat of the escape valve substantially at an equal value so as to maintain a pressure balance between a pressure acting on the escape valve for valve closing and a pressure acting on the escape valve for valve opening while setting a spring load of a first check valve spring urging the first check valve in the direction of valve closing and that of the escape valve spring such that a pressure of the midstream region is maintained always lower by a predetermined value than a pressure on the upstream side, the pressure in the midstream region can be controlled without installing an independent pressure regulator mechanism as in the case of a conventional reverse flow prevention apparatus, thereby solving the problems as described above while drastically lessening pressure loss in comparison with that for the conventional reverse flow prevention apparatus.

BRIEF DESCRIPTION OF THE DRAWINGS

Fig, 9 is a sectional view of another embodiment of the reverse flow prevention apparatus according to the invention, with a flow rectifier assembled therein.

DETAILED DESCRIPTION OF THE PREFERRED EMBODIMENTS

Embodiments of a reverse flow prevention apparatus according to the invention are described hereinafter with reference to the accompanying drawings.

Figure 1:
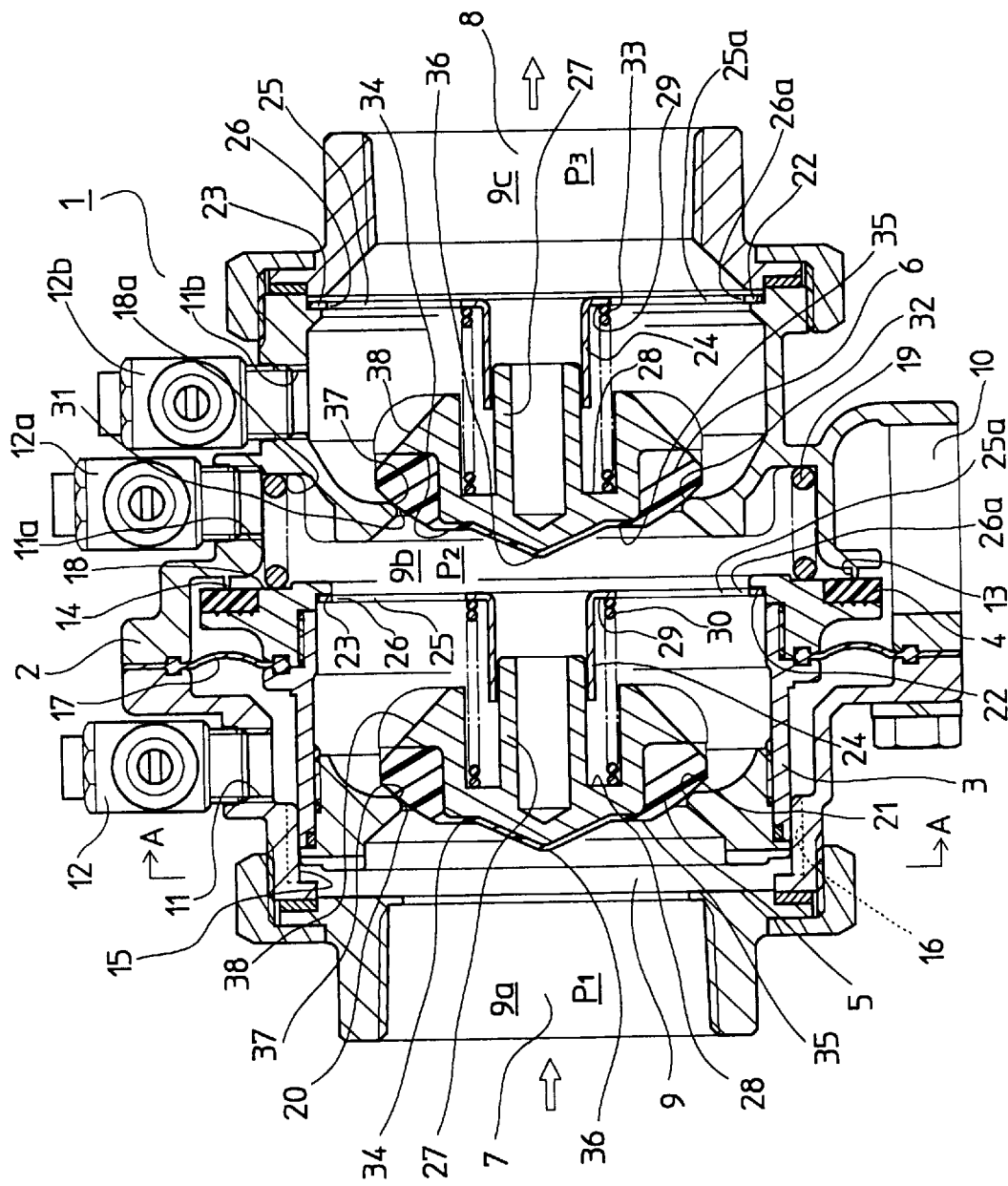
FIG. 1 is a sectional view of an embodiment of a reverse flow prevention apparatus according to the invention, in a condition wherein no water is flowing.
Figure 2:
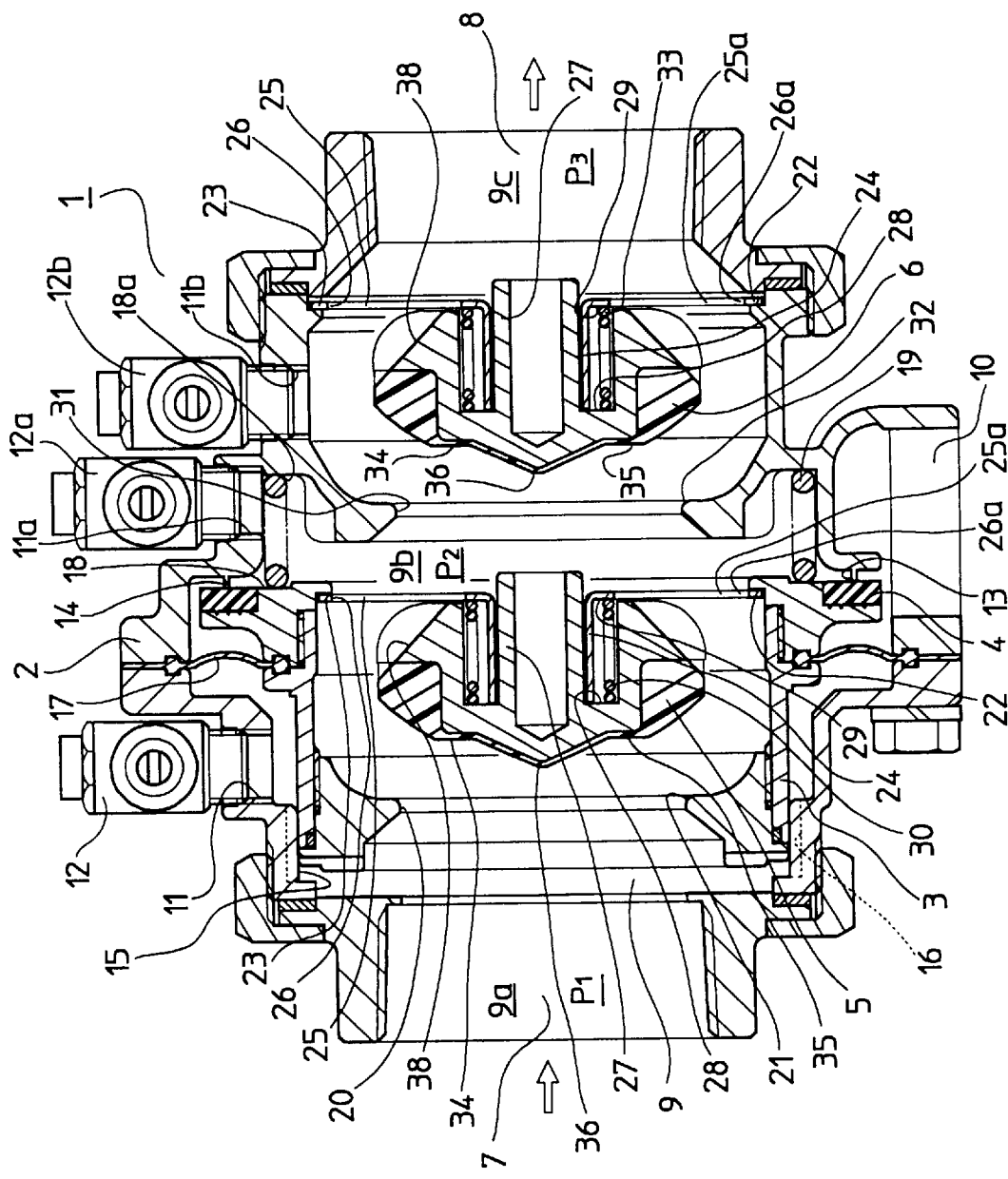
FIG. 2 is a sectional view of the embodiment of the reverse flow prevention apparatus according to the invention, in a condition wherein water is flowing.

FIG. 1 is a sectional view of an embodiment of the reverse flow prevention apparatus according to the invention, in a condition wherein no water is flowing, and FIG. 2 is a sectional view of the same in a condition wherein water is flowing.

The reverse flow prevention apparatus 1 comprises mainly an outer box 2, an inner cylindrical body 3, an escape valve 4, and first and second check valves 5, 6.

The outer box 2 is provided with a flow path 9 coaxially formed therewith between an inlet 7 and an outlet 8, linked with a distributing water piping on the upstream side and the same on the downstream side, respectively, and is further provided with a drain outlet 10 in a midstream region 9b of the flow path 9, leading externally in a direction perpendicular to the flow path 9.

The drain outlet 10 is formed so as to secure a predetermined space (clearance) for a discharge spout, and to face a drain ditch (not shown), so that indirect drain is effected under natural flow of water.

Further, the outer box 2 is provided with openings for external linking, 11, 11a . . . at positions corresponding to an upstream region 9a, the midstream region 9b, and a downstream region 9c, respectively, and the openings for external linking 11, 11a . . . are linked with ball valves 12, 12a . . . which are normally (except at times for inspection) closed and for use in checking pressure.

A valve port 13 is provided between the midstream region 9b, and the downstream region 9c, and a valve seat 14 is provided around the valve port 13.

Figure 5:
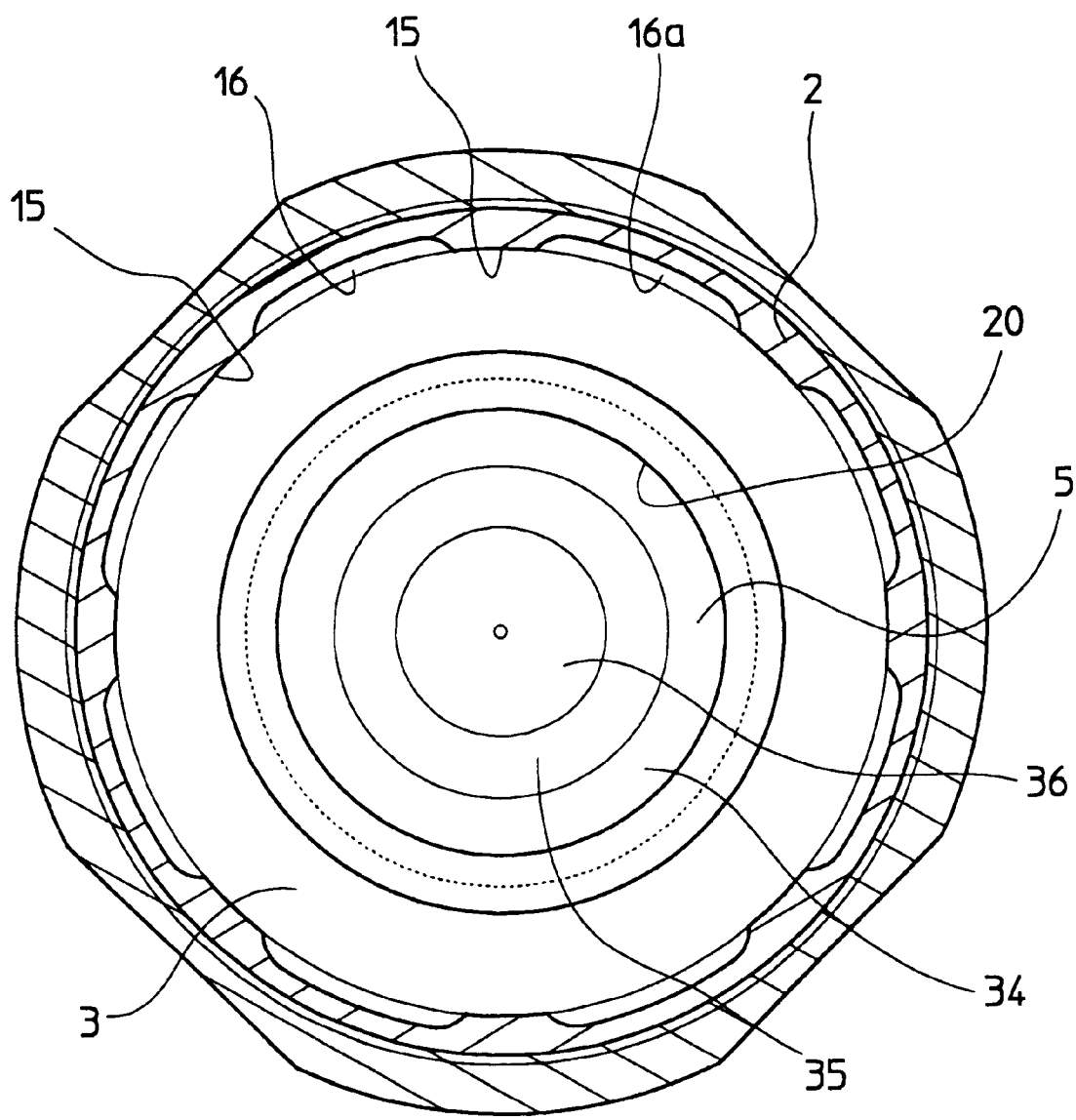
FIG. 5 is an enlarged sectional view of principal parts of the embodiment of the reverse flow prevention apparatus, taken on line A—A of FIG. 1.

Further, the upstream region 9a of the outer box 2 has a sliding surface 15 slidable against the inner cylindrical body 3, and as shown in FIG. 5, the sliding surface 15 is provided with a plurality of recessed grooves 16, 16a . . . notched at equal intervals in a circumferential direction on an inner surface of the outer box 2, circular in section.

The inner cylindrical body 3 is formed substantially in the shape of a cylinder, and is slidably fitted into the upstream region 9a of the outer box 2.

And an area of the outer box 2, in contact with the inner cylindrical body 3, is decreased owing to the sliding surface 15 having the recessed grooves 16, 16a . . . notched thereon, so that sliding resistance of the inner cylindrical body 3 is reduced.

In order to reduce the sliding resistance of the inner cylindrical body 3, the inner surface (the sliding surface 15) of the upstream region 9a of the outer box 2 is worked on as described above instead of working on the outer peripheral surface of the inner cylindrical body 3 because if, for example, a plurality of recessed grooves are formed in a circumferential direction on the outer peripheral surface of the inner cylindrical body 3, or the inner cylindrical body 3 is formed so as to have an outside shape polygonal in section, it becomes necessary to increase wall thickness of the inner cylindrical body 3 for maintaining a strength thereof. Then, this will result in an increase in a weight of the inner cylindrical body 3, and in the last analysis, reduction in the sliding resistance can not be achieved.

In this connection, according to the invention, since the sliding surface 15 of the upstream region 9a is worked on as above, and at the same time, the inner cylindrical body 3 is formed to have the outside shape circular in section so as to be capable of withstanding a high external pressure, the inner cylindrical body 3 can be rendered relatively thin in wall thickness and light in weight.

Furthermore, by applying Teflon coating to the outer peripheral surface of the inner cylindrical body 3, the sliding resistance against the sliding surface 15 is further reduced, thereby achieving reduction in the sliding resistance.

A diaphragm 17 for partitioning the flow path 9 into the upstream region 9a, and the downstream of the midstream region 9b is provided on the outer periphery of the inner cylindrical body 3, on the downstream side.

And the escape valve 4 made of a synthetic rubber is provided on a face at an open end of the inner cylindrical body 3, on the downstream side.

The escape valve 4 is disposed opposite to a valve seat 14, and is installed in such a way as to be freely attachable to and detachable from the valve seat 14 depending on displacement of the diaphragm 17.

Further, an escape valve spring 19 is installed between an inner end face 18 of the escape valve 4, on the face of the open end of the inner cylindrical body 3, and a recess 18a provided between the midstream region 9b and the downstream region 9c, so that the escape valve 4 is energized towards valve opening by the urging of the escape valve spring 19.

The first and second check valves 5, 6 are formed in an identical shape, and are provided inside the inner cylindrical body 3 and the downstream region 9c of the outer box 2, respectively, such that reverse flow of a fluid from the downstream side can be prevented.

The first check valve 5 is installed so as to be freely attachable to and detachable from a first check valve seat 21 provided around an open end of the inner cylindrical body 3, on the upstream side, serving as a first check valve port 20.

Further, the first check valve 5 is supported by a guide ring 22 disposed on an inner periphery of the open end of the inner cylindrical body 3, on the downstream side.

The guide ring 22 couples up a support frame 23 in annular shape, engaged with and disposed on the inner periphery of the open end of the inner cylindrical body 3, on the downstream side, to a valve spindle guide 24 in cylindrical shape, disposed at the center of the support frame 23, by means of a plurality of support rods 25, 25a . . .

And respective clearances between the support rods 25, 25a . . . , adjacent to each other, forms openings 26, 26a . . . for linking the interior of the inner cylindrical body 3 with the midstream region 9b.

A valve spindle 27 projected from the back of the first check valve 5 is slidably fitted in the valve spindle guide 24, and a first check valve spring 30 is installed between an annular recess 28 provided around the valve spindle 27 and a spring bearing 29 in collar shape, projected from the periphery of the base end of the valve spindle guide 24, so that the first check valve 5 is energized in the direction of valve closure by the urging of the first check valve spring 30.

The second check valve 6 is installed so as to be freely attachable to and detachable from a second check valve seat 32 provided around a second check valve port 31 provided between the midstream region 9b and the downstream region 9c.

As with the case of the first check valve 5, the second check valve 6 is supported by a guide ring 22 of the same constitution as described above, disposed midway in the downstream region 9c, and at the same time, the second check valve 6 is energized in the direction of valve closure by the urging of a second check valve spring 33 installed between the second check valve 6 and the guide ring 22.

As for the second check valve 6 and the guide ring 22 thereof, the same parts as or parts corresponding to those for the first check valve 5 and the guide ring 22 thereof are denoted by the same reference numerals, and description thereof is omitted.

Figure 6:
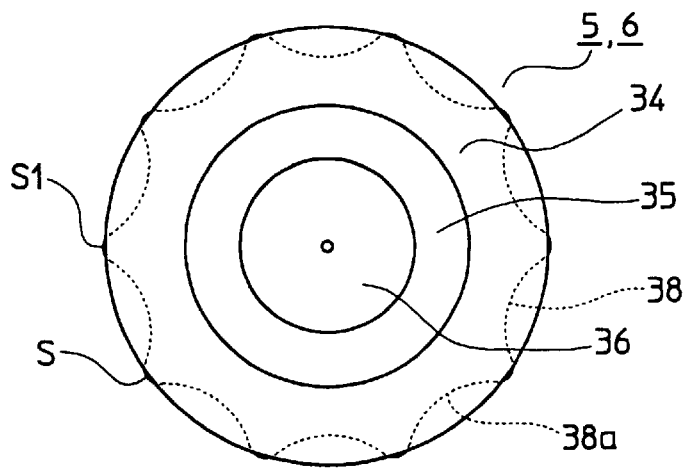
FIG. 6 is a plan view of first and second check valves of the embodiment of the reverse flow prevention apparatus, respectively.
Figure 7:
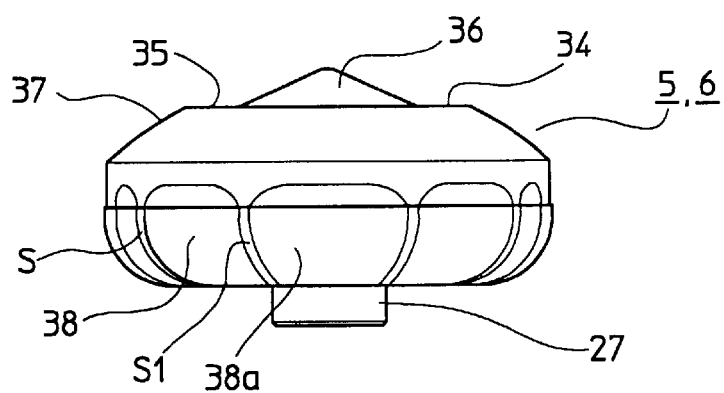
FIG. 7 is a front elevation of the first and second check valves, respectively, shown in FIG. 6.
Figure 8:
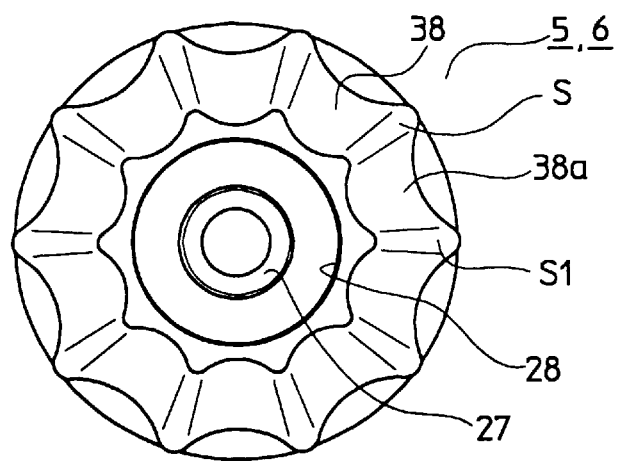
FIG. 8 is a bottom plan view of the first and second check valves, respectively, shown in FIG. 6.

Now, referring to FIGS. 6 to 8, a shape of the first and second check valves 5, 6, respectively, is described hereinafter. FIG. 6 is a plan view of the first and second check valves 5, 6, respectively, FIG. 7 a front elevation thereof, and FIG. 8 a bottom plan view thereof The first and second check valves 5, 6 are formed substantially in the shape of a mushroom, and a butting surface 34, facing the first check valve port 20 and the second check valve port 31, respectively, is provided with a flat surface 35 having a diameter smaller than that of the first check valve port 20 and the second check valve port 31, respectively, and also provided with an apex part 36, conical in shape, at the center of the flat surface 35.

Further, the first and second check valves 5, 6 are provided, respectively, with tilted grooves 38, 38a . . . formed such that a width thereof is gradually decreased from the peripheral region of a seating part 37 for fitting to the first check valve seat 21 and the second check valve seat 32, respectively, provided on the outer periphery of the flat surface 35, towards the center of the back of the first and second check valves 5, 6, respectively (that is, towards the valve spindle 27).

The tilted grooves 38, 38a . . . are provided at equal intervals (narrow intervals S, S1 . . . ) along the circular periphery of the first and second check valves 5, 6, respectively.

Figure 3:
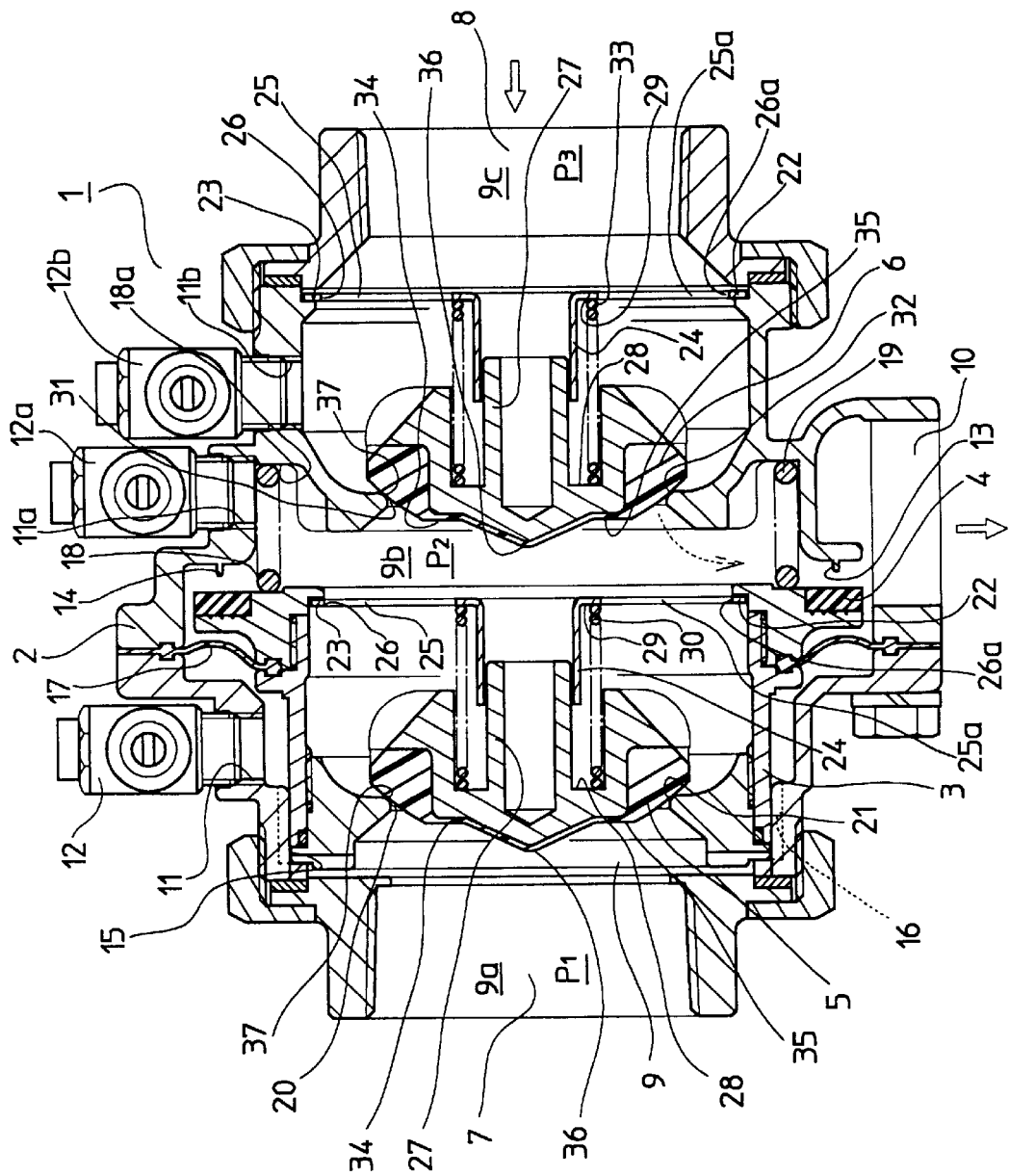
FIG. 3 is a sectional view of the embodiment of the reverse flow prevention apparatus according to the invention, in a condition wherein an escape valve is open at the time of reverse flow or reverse siphonage.

As shown in FIGS. 1 to 3 indicating the sectional view, respectively, the butting surface 34 of the first and second check valves 5, 6, respectively, is formed in the shape as described above with a coating of a synthetic rubber formed thereon.

With the use of the first and second check valves 5, 6, formed in the shape as described above, when these valves are in an open condition as shown in FIG. 2, water flow branches in a radial manner by the agency of the apex part 36 of the butting surface 34, whereupon water pressure on the upstream side is applied to the flat surface 35 continuing from the apex part 36, thereby fully opening the valves in a stroke.

When the valves are fully opened and an amount of water passing therethrough increases, passages of water flow from the outer periphery of the first and second check valves 5, 6, respectively, towards the downstream side are restrained by the tilted grooves 38, 38a . . . thereby increasing a flow velocity, and allowing water to flow along the outside shape of the first and second check valves 5, 6.

Figure 9:
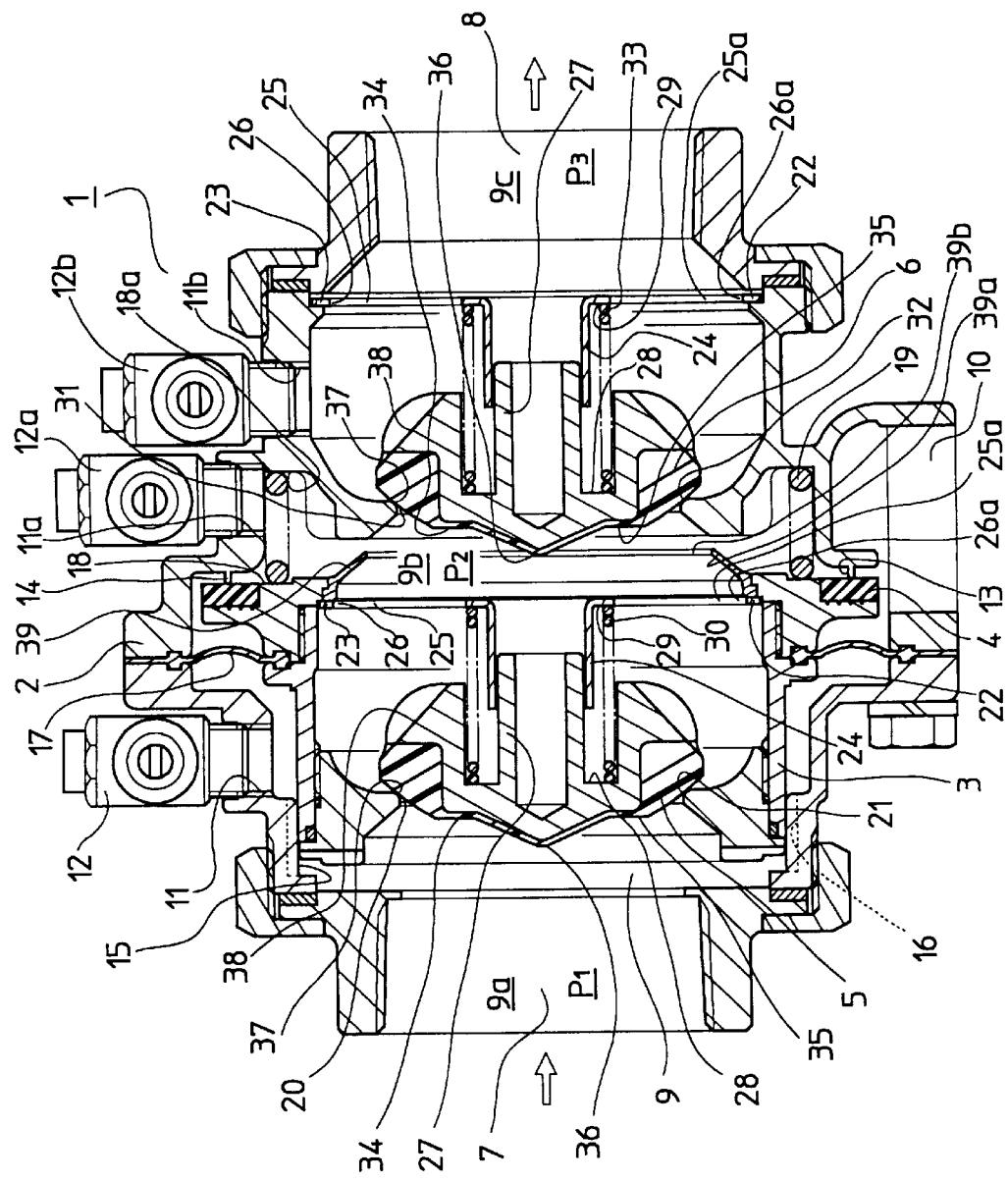
Figure 10:
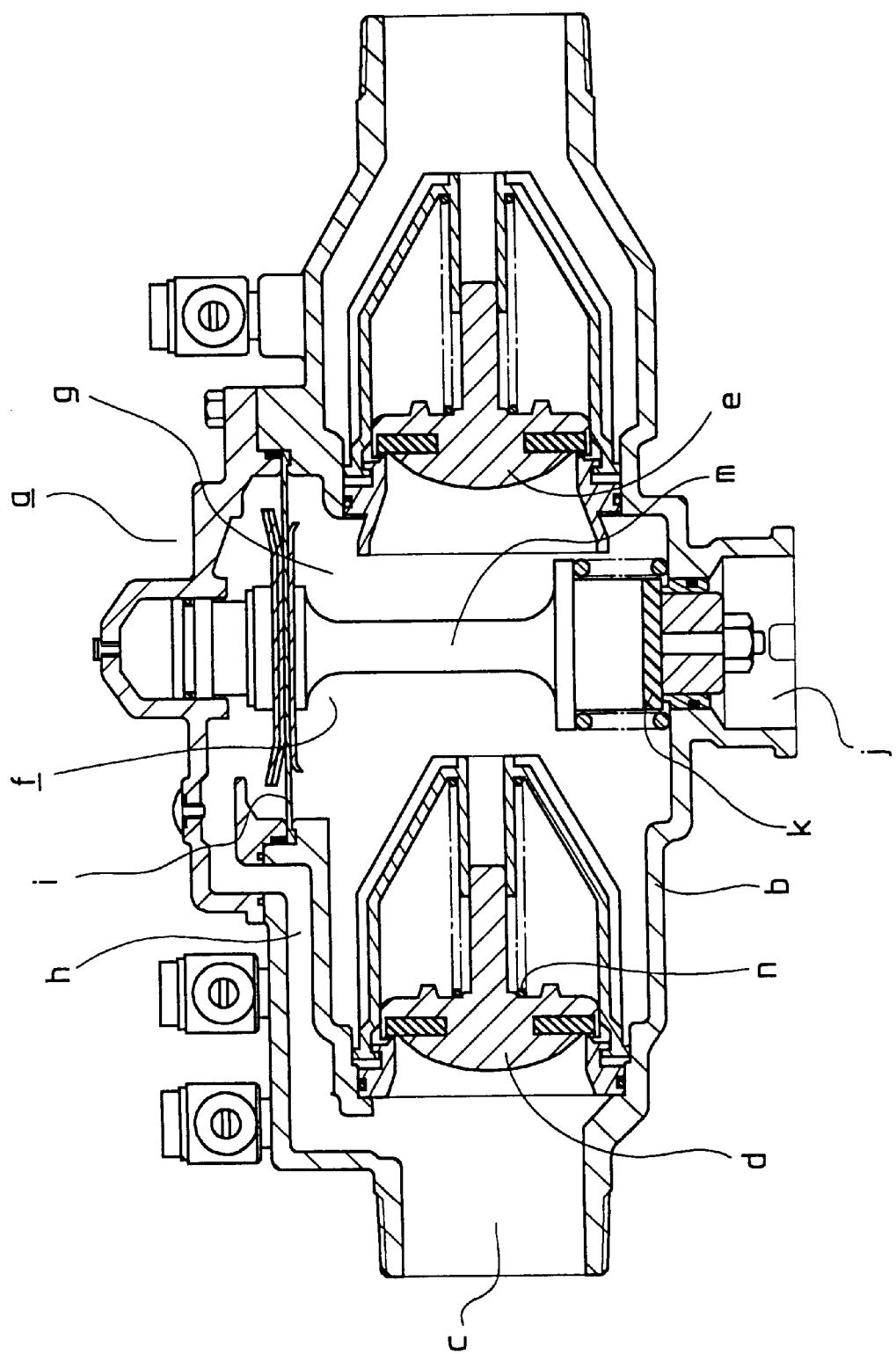
FIG. 10 is a sectional view showing a conventional pressure-reduction type reverse flow prevention apparatus.

Further, with a reverse flow prevention apparatus 1 shown in FIG. 9, a flow rectifier is installed in the midstream region 9b such that flow of a fluid moving from the upstream side towards the downstream side is rectified so as to further mitigate pressure loss.

The flow rectifier 39 is made up of a flow passage 39a continuing from the open end of the inner cylindrical body 3, on the downstream side, which is formed in tapered shape with a diameter thereof gradually contracted from the upstream side towards the downstream side, and projected into the midstream region 9b, and a port 39b of the flow passage 39a, on the downstream side, is formed to face the second check valve port 31, an inlet to the downstream region 9c, so as to be linked thereto.

Since the flow passage 39a of the flow rectifier 39, with the diameter gradually contracted from the upstream side towards the downstream side, guides water flow substantially continuously from the upstream region 9a to the downstream region 9c, it is possible to render extreme variation in water flow less than that occurring in the flow path from the upstream region 9a to the downstream region 9c in the case of the reverse flow prevention apparatus wherein the flow passage 39a is not formed, thereby decreasing generation of turbulent flow in the flow passage 39a, so that pressure loss is further reduced.

Next, means for controlling pressure of the midstream region 9b are described hereinafter.

Figure 4:
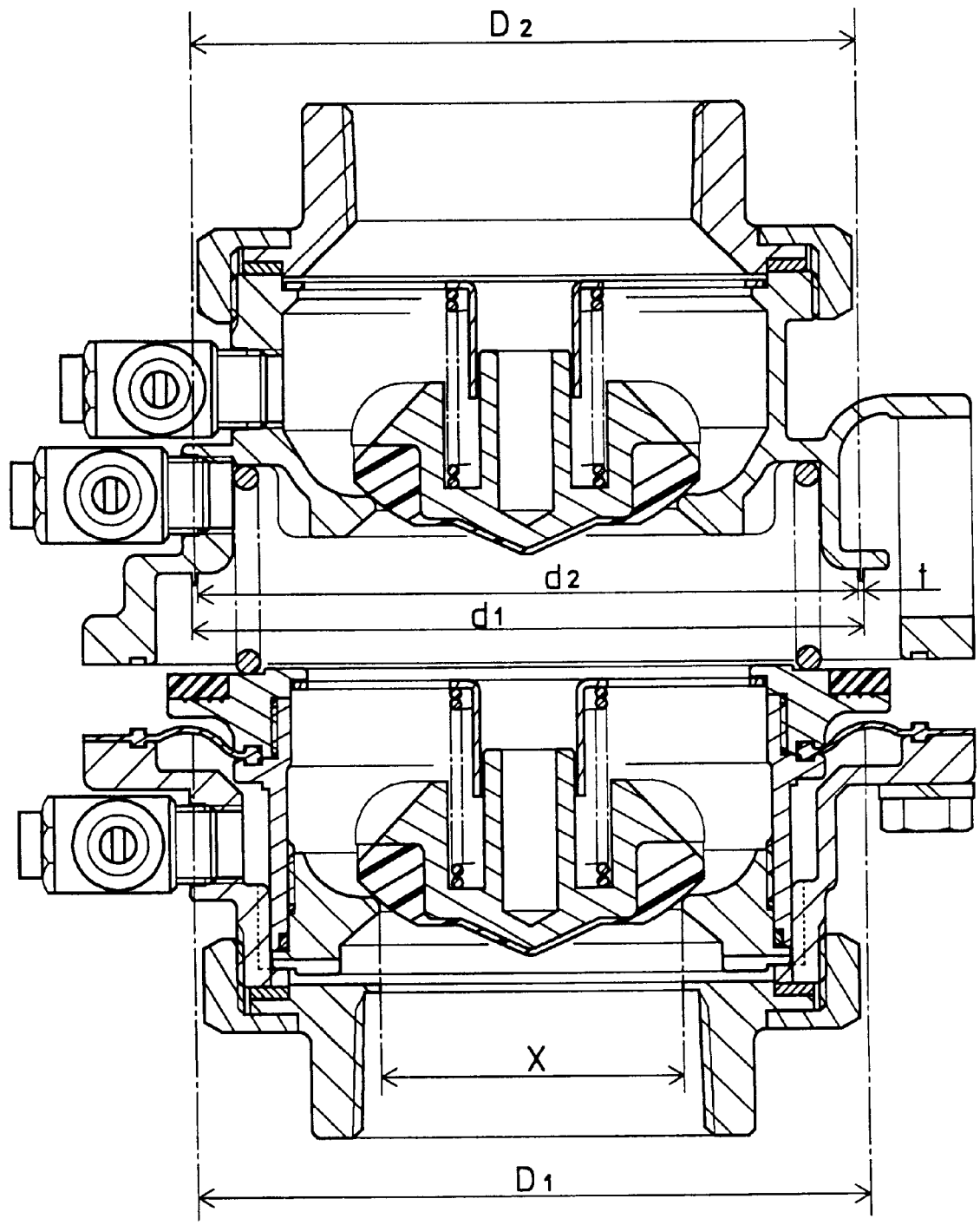
FIG. 4 is a view indicating a size of respective parts of the embodiment of the reverse flow prevention apparatus according to the invention.

In FIG. 4, sizes of relevant parts of the reverse flow prevention apparatus 1, described hereinafter, are shown. In FIG. 4, the outer box 2 is illustrated by partitioning the same at the midstream region 9b for the sake of convenience.

By use of the means described, the escape valve 4 is controlled so as to be opened always at a pressure of the midstream region 9b, lower by a predetermined value than a pressure on the upstream side within a scope of pressure applied on the upstream side.

More specifically, this can be achieved by setting an effective diameter of the diaphragm 17 and a diameter of the valve seat of the escape valve 4 substantially at an equal value (condition 1) in order to maintain a balance between a pressure acting on the escape valve 4 for opening it and a pressure acting on the escape valve 4 for closing it while setting a spring load of the escape valve spring 19 and that of the first check valve spring 30 such that a pressure of the midstream region 9b is maintained always lower by a predetermined value than a pressure on the upstream side (condition 2).

The condition 1 is given by the following expression:

$$A-B-C=D+\alpha \tag{1}$$

where
A=a force for closing the escape valve, acting thereon due to a pressure on the upstream side being received by an effective area of the diaphragm,
B=a force for opening the escape valve, acting thereon due to a pressure of the midstream region being received by an area within the inner periphery of the valve seat of the escape valve,
C=a force for opening the escape valve, acting thereon by the urging of the escape valve spring,
D=a pressing (sealing) force for closing the escape valve, acting thereon (synthetic rubber), and
α=a frictional resistance force occurring to the inner cylindrical body at the time of opening or closing the escape valve.

Further, based on an assumption that
$D_1$=an effective diameter of the diaphragm,
$D_2$=a diameter of the valve seat (the center part) of the escape valve,
$d_1$=an outside diameter of the valve seat of the escape valve,
$d_2$=an inside diameter of the valve seat of the escape valve,
$P_1$=a pressure on the upstream side,
$P_2$=a pressure of the midstream region,
E=a factor for opening the escape valve in a closed condition (E is assumed at less than 1 as it is smaller than a factor for closing the escape valve in an open condition),
$\Delta P$=a differential pressure between the pressure on the upstream side and the pressure of the midstream region when the escape valve is caused to open,
F=a spring load of the escape valve spring, and
t=wall thickness of the valve seat of the escape valve,
expression (1) can be replaced by the following:

$$\pi(D_1/2)^2 P_1 - \pi(D_2/2)^2 P_2 - F = \{\pi(d_1/2)^2 - \pi(d_2/2)^2\} P_2 E + \alpha \tag{1'}$$

Further, since there exists the following relationship:
$P_2 = P_1 - \Delta P$,
$d_1 = D_2 + t$, and
$d_2 = D_2 - t$,
substituting these values in expression (1)' yields the following:

$$(\pi P_1/4)\{D_1^2 - D_2(D_2+4t)\} = \alpha - \{(\pi \Delta P D_2/4)(D_2+4t) - F\} \tag{1''}$$

Accordingly, expression (1)" holds provided that $$D_1^2 = D_2(D_2+4t), \text{ and} \quad (2)$$

$$\alpha = (\pi \Delta P D_2/4)(D_2+4t) - F \quad (3)$$

Thus, it is shown that even if there is a change in the pressure $P_1$ on the upstream side, a balance between the force for opening the escape valve, acting thereon, and the force for closing the escape valve, acting thereon, can be stably maintained.

Further, since $D_2 \gg t$, $D_1$ is approximately equal to $D_2$ from $D_1^2 = D_2(D_2+4t)$.

The condition (2) means that the escape valve 4 is to maintain a closed condition normally (at both a time of water flowing and a time of no water flowing), and for this reason, it is required that a pressure of a fluid flowing after the pressure thereof is lowered by the agency of the first check valve spring 30 is higher than the pressure of the midstream region 9b.

The condition (2) is represented by the following expression:

$$\Delta P_1 > \Delta P + P_a + P_b \quad (4)$$

where
$\Delta P_1$ = a differential pressure between a pressure on the upstream side and a pressure of the midstream region, developed by the first check valve spring,
$\Delta P$ = a differential pressure between a pressure on the upstream side and a pressure of the midstream region, developed when the escape valve is caused to open,
$P_a$ = a differential pressure between a pressure on the upstream side and a pressure of the midstream region, developed by the escape valve spring, and
$P_b$ = the minimum pressure required for closing the escape valve ($\Delta P - \Delta P_1$).

Furthermore, based on an assumption that
x = a diameter of the first check valve seat (the center part thereof),
$D_2$ = the diameter of the valve seat (the center part) of the escape valve,
F = a spring load of the escape valve spring, and
f = a spring load of the first check valve spring, expression (4) can be replaced by the following:

$$\Delta P_1 > \Delta P + P_a + (\Delta P - \Delta P_1) \ 2f/\{\pi(x/2)^2\} > 2\Delta P + F/\{\pi(D_2/2)^2\} \quad (4)'$$

Accordingly, a combination of the spring load F of the escape valve spring 19 and the spring load f of the first check valve spring 30 is selected based on the above expression satisfying the condition (2), thereby setting up the escape valve spring 19 and the first check valve spring 30, respectively.

And on the basis of the diameter $D_2$ of the valve seat (the center part) of the escape valve=10.95 cm, the diameter x of the first check valve seat 21 (the center part thereof)=5 cm, the wall thickness t of the valve seat 14 of the escape valve 4=0.1 cm, and the differential pressure $\Delta P$ as desired for opening the escape valve 4=0.2 kgf/cm², the effective diameter $D_1$ of the diaphragm 17=11.15 cm is calculated from expression (2) given above.

Further, based on expression (4)' given above, the escape valve spring 19 and the first check valve spring 30 are selected such that the spring load F of the escape valve spring 19=10.00 kgf and the spring load f of the first check valve spring 30 =6.00 kgf.

Based on expression (3) given above, the frictional resistance force $\alpha = 9.52$ kgf is calculated.

When the pressure $P_1$ on the upstream side was varied from 1 to 10 kgf/cm² using the reverse flow prevention apparatus 1 manufactured based on the above-mentioned values, the differential pressure $\Delta P$ for opening the escape valve 4 was found at about 0.2 kgf/cm² on average.

Thus, with the reverse flow prevention apparatus 1 described above, it was possible to maintain the pressure $P_2$ of the midstream region 9b at the pressure $\Delta P$ which is always lower by a given value (0.2 kgf/cm²) than the pressure $P_1$ on the upstream side.

Now, referring to FIGS. 1 to 3, operation of the reverse flow prevention apparatus 1 is described hereinafter.

In the condition wherein no water is flowing as shown in FIG. 1, the first and second check valves 5, 6, and the escape valve 4 are closed, and respective pressures $P_1$, $P_2$, $P_3$ of the upstream, midstream and downstream regions, 9a, 9b, and 9c have a correlation represented by $P_1 > P_2 > P_3$.

In the condition wherein water is flowing as shown in FIG. 2, the first and second check valves 5, 6 are open, the escape valve 4 is closed, and the respective pressures $P_1$, $P_2$, $P_3$ of the upstream, midstream and downstream regions, 9a, 9b, and 9c have a correlation represented by $P_1 > P_2 > P_3$.

Further, in case of reverse flow occurring due to a reverse pressure, the escape valve 4 is closed, and the first and second check valves 5, 6 are closed in the same condition as shown in FIG. 1, thereby preventing reverse flow towards the upstream side.

In this case, the respective pressures $P_1$, $P_2$, $P_3$ of the upstream, midstream and downstream regions, 9a, 9b, and 9c have a correlation $P_3 > P_1 > P_2$.

If both or one of the first and second check valves 5, 6 should develop a failure due to jamming thereof with rubbish or the like, and leakage of water into the midstream region 9b occurs in the direction of the arrow indicated by the broken line in FIG. 3 with the result that the pressure $P_2$ of the midstream region 9b rises higher by the differential pressure $\Delta P$ as set between the pressure $P_2$ of the midstream region and the pressure $P_1$ of the upstream region, the escape valve 4 is caused to open as shown in FIG. 3, and a specified quantity of water is discharged, thereby preventing reverse flow towards the upstream side from occurring.

In a condition of reverse siphonage shown in FIG. 3, if the pressure $P_1$ on the upstream side becomes a relatively lower pressure due to reverse siphoning with the first and second check valves 5, 6 in a closed condition, the escape valve 4 is caused to open, thereby discharging the fluid in the midstream region 9b, and acting as a vacuum breaker by maintaining the pressure $P_2$ of the midstream region at an atmospheric pressure, so that reverse flow is prevented.

Further, even if a reverse pressure from the downstream side is developed at this point in time, there will arise no problem because reverse flow can be prevented by the second check valve 6.

Even if both or one of the first and second check valves 5, 6 should be jammed with rubbish or the like at the time of such reverse siphonage, the butting surface 34 of the first and second check valves 5, 6, respectively, including the seating part 37, made of the synthetic rubber, is caused to dig into the first check valve seat 21 and the second check valve seat 32, respectively, due to the relatively lower pressure on the upstream side, thereby maintaining a closed condition of the first and second check valves 5, 6, so that the fluid in the midstream region 9b is discharged as described above by the action of the vacuum breaker, and reverse flow is prevented.

To sum up, in accordance with a first aspect of the invention, there is provided the reverse flow prevention apparatus 1 wherein the flow path 9 running along a straight line, provided in the outer box 2, is partitioned by the diaphragm 17 into the upstream region 9*a*, and the downstream of the midstream region 9*b*, the inner cylindrical body 3 formed at the center of the diaphragm 17, integrally therewith, is provided to fit slidably into the upstream region 9*a* of the outer box 2, the escape valve 4 is provided on the downstream side of the inner cylindrical body 3 so as to be able to freely open and close the valve port 13 disposed between the midstream region 9*b* and the downstream region 9*c* while energizing the escape valve 4 towards valve opening by the urging of the escape valve spring 19, and the first and second check valves 5, 6 are provided inside the inner cylindrical body 3 and the downstream region 9*c* of the outer box 2, respectively. Accordingly, the escape valve 4 can be assembled into the flow path 9 running along a straight line without need for installing the escape valve k and the bypass h (the pressure regulator mechanism f), mechanically independent from the first and second check valves d and e, in order to control a pressure in the intermediate chamber g as in the case of the conventional type pressure-reduction type reverse flow prevention apparatus a. Hence, it has become possible to provide the reverse flow prevention apparatus 1 which is lighter in weight and more compact than the conventional one while requiring less components thereof.

Further, since the effective diameter $D_1$ of the diaphragm 17 and the diameter $D_2$ of the valve seat 14 are set substantially at an equal value in order to maintain a pressure balance between the pressure acting on the escape valve 4 for valve closing, received by the diaphragm 17, and the pressure acting on the escape valve 4 for valve opening, received by itself while setting the spring load F of the escape valve spring 19 and the spring load f of the first check valve spring 30 such that the pressure $P_2$ of the midstream region 9*b* is maintained at the pressure $\Delta P$ which is always lower by the predetermined value than the pressure $P_1$ on the upstream side, it has become possible to control the pressure in the intermediate chamber g without the use of the pressure regulator mechanism f, mechanically independent from the first and second check valves d and e, or another type of pilot-operated control mechanism. Furthermore, with the means of controlling pressure according to the invention, only if a combination of the spring load F of the escape valve spring 19 and the spring load f of the first check valve spring 30 is selected on the basis of the condition wherein the pressure balance is maintained between the pressure acting on the escape valve 4 for valve closing and the pressure acting on the escape valve 4 for valve opening, precision control of pressure can be effected with ease such that the pressure $P_2$ of the midstream region 9*b* is maintained always lower by the predetermined value than the pressure $P_1$ on the upstream side.

Also, there is no need of increasing the spring load of the first check valve spring n as in the conventional case because of capability of the reverse flow prevention apparatus 1 for such control of pressure, so that pressure loss due to the first check valve spring 30 can be drastically reduced, resulting in enhanced performance of pumps for a water distribution system, and thus enabling downsized pumps to perform supply of water.

With these features described above, since the inner cylindrical body 3 is formed in a shape circular in section, and the plurality of the recessed grooves 16, 16*a* . . . are notched on the sliding surface 15 of the inner surface of the outer box 2, slidable against the inner cylindrical body 3, at equal intervals in the circumferential direction thereof, the area of the outer box 2, sliding against the inner cylindrical body 3, can be decreased, and at the same time, the inner cylindrical body 3 can be rendered thinner in wall thickness and lighter in weight without lowering a strength thereof, so that sliding resistance of the inner cylindrical body 3 can be reduced as far as the strength of the inner cylindrical body 3 permits, thereby enabling pressure loss to be further lessened.

Further, with some of the features described in the foregoing, the frictional resistance of the inner cylindrical body 3 against the outer box 2 is further decreased by applying the Teflon coating to the outer peripheral surface of the inner cylindrical body 3, thereby achieving a decrease in pressure loss similarly to the case described as above.

Still further, with some of the features described in the foregoing, the butting surface 34 of the first and second check valves 5, 6, facing the first check valve port 20 and the second check valve port 31, respectively, is provided with the flat surface 35 having a diameter smaller than that of the first check valve port 20 and the second check valve port 31, and also provided with the apex part 36, conical in shape, at the center of the flat surface 35. Further, the first and second check valves 5, 6 are provided, respectively, with the tilted grooves 38, 38*a* . . . formed such that the width thereof is gradually decreased from the peripheral region of the seating part 37 for fitting to the first check valve seat 21 and the second check valve seat 32 towards the center of the back of the first and second check valves 5, 6, and at equal intervals along the circular periphery of the first and second check valves 5, 6, respectively. In consequence, a smooth water flow occurs from the upstream to the downstream along the outside shape of the first and second check valves 5, 6 without a hindrance in such a way as not to cause a vortex behind the back of the first and second check valves 5, 6, thereby enabling pressure loss resulting from presence of the first and second check valves 5, 6 in the flow path 9 to be lessened, and exhibiting the same advantageous effect as described above.

In accordance with another aspect of the invention, the flow passage 39*a* continuing to the open end of the inner cylindrical body 3, on the downstream side, and formed in tapered shape with a diameter thereof gradually contracted from the upstream side towards the downstream side, is preferably projected into the midstream region 9*b*, and the port 39*b* of the flow passage 39*a*, on the downstream side, is formed to face the downstream region 9*c* so as to be linked thereto. In consequence, since the upstream region 9*a* and the downstream region 9*c* are substantially linked with each other via the flow passage 39*a* in the midstream region 9*b*, and the flow passage 39*a* has the diameter thereof gradually contracted from the upstream region 9*a* towards the downstream region 9*c*, it is possible to render flow of the liquid within the flow passage 39*a* to become a uniform and rectified flow, and to lessen pressure loss in the flow passage 39*a*, so that, for example, performance of pumps for a water distribution system can be enhanced, and supply of water can be performed by downsized pumps as described above. Thus, practical merits of the invention will be quite significant.

What is claimed is:

1. A reverse flow prevention apparatus comprising:
    an outer box provided with a flow path formed coaxially therewith between an inlet and an outlet, and also provided with a drain outlet in a midstream region of the flow path;
    a diaphragm provided on the inner periphery of the outer box for partitioning the interior thereof into an upstream region of the flow path, and the downstream of the midstream region;

an inner cylindrical body slidably fitted into the upstream region of the outer box;

an escape valve provided on a face of an open end of the inner cylindrical body, on the downstream side, so as to be freely attachable to and detachable from a valve seat provided around a valve port formed between the midstream region and a downstream region, and energized in the direction of valve opening by the urging of an escape valve spring; and first and second check valves provided inside the inner cylindrical body and the downstream region of the outer box, respectively, such that reverse flow of a fluid from the downstream side can be prevented, wherein an effective diameter of the diaphragm and a diameter of the valve seat of the escape valve are set substantially at an equal value so as to maintain a pressure balance between a pressure acting on the escape valve for valve closing and a pressure acting on the escape valve for valve opening while a spring load of a first check valve spring urging the first check valve in the direction of valve closing and that of the escape valve spring are set such that a pressure of the midstream region is maintained always lower by a predetermined value than a pressure on the upstream side.

2. A reverse flow prevention apparatus according to claim 1, wherein the inner cylindrical body is formed in a shape circular in section while a sliding surface of an inner surface of the outer box, sidable against the inner cylindrical body, is provided with a plurality of recessed grooves notched at equal intervals in the direction of the circumference of the sliding surface.

3. A reverse flow prevention apparatus according to claim 1, wherein a TEFLON coating is applied to an outer peripheral surface of the inner cylindrical body.

4. A reverse flow prevention apparatus according to claim 1 wherein a butting surface of the first check valve and the second check valve, facing the first check valve port and the second check valve port, respectively, is provided with a flat surface having a diameter smaller than that of the first check valve port and the second check valve port while an apex part, conical in shape, is formed at the center of the flat surface, and tilted grooves are formed at equal intervals in the direction of the circumference of the first and second check valves, respectively, such that a width thereof is gradually decreased from the peripheral region of a seating part of the butting surface for fitting to first and second check valve seats, respectively, towards the center of the back of the first and second check valves.

5. A reverse flow prevention apparatus as in according to claim 1 wherein a flow passage continuing to the open end of the inner cylindrical body, on the downstream side, formed in tapered shape with a diameter gradually contracted from the upstream side towards the downstream side, is projected into the midstream region, and a port of the flow passage, on the downstream side, is formed to face the downstream region so as to be linked thereto.

* * * * *